United States Patent
Pfob et al.

[11] Patent Number: 5,873,681
[45] Date of Patent: Feb. 23, 1999

[54] CUTTER PLATE FOR MILLING TOOL

[75] Inventors: Franz Pfob, Probstried; Horst Nespeta, Rainau-Buch, both of Germany

[73] Assignee: Zettl GmbH CNC Prazisions-und, Betziau, Germany

[21] Appl. No.: 900,844

[22] Filed: Jul. 25, 1997

[30] Foreign Application Priority Data

Aug. 5, 1996 [DE] Germany ............... 196 31 578.6

[51] Int. Cl.[6] .................................................. B23C 05/12
[52] U.S. Cl. .................. 407/42; 407/57; 407/62; 407/114; 82/13
[58] Field of Search ...................... 407/42, 21, 24, 407/25, 26, 33, 34, 47, 48, 51, 53, 56, 57, 59, 62, 63, 113, 114; 82/13

[56] References Cited

U.S. PATENT DOCUMENTS

| | | | |
|---|---|---|---|
| 4,115,024 | 9/1978 | Sussmuth | 407/54 X |
| 4,655,648 | 4/1987 | Hellbergh | 407/42 |
| 5,059,069 | 10/1991 | Lagerberg | 407/114 X |
| 5,098,232 | 3/1992 | Benson | 407/24 X |
| 5,325,748 | 7/1994 | Ehrengerb | 407/114 X |

FOREIGN PATENT DOCUMENTS

| | | |
|---|---|---|
| 0392730 | 10/1990 | European Pat. Off. . |
| 3618574 | 6/1986 | Germany . |

*Primary Examiner*—Andrea L. Pitts
*Assistant Examiner*—Henry W.H. Tsai
*Attorney, Agent, or Firm*—Notaro & Michalos P.C.

[57] ABSTRACT

A cutter plate (20) for a milling tool (10), has a top surface (26) with fastening hole and a bottom surface (28) with a thread cutting profile. Between these two faces (24, 26) and at a side surface (28), a cutting edge (32) is formed which is adjoined in the top surface (24) by a chip guide groove (34) with chip outlet edge (36). The cutting edge (32) and the chip outlet edge (36) are disposed on helicoidal paths (38, 40) which diverge in top view. Tooth edges (42) on the side surface form angles (b) with the top surface (24). The cutter plate (20) can be installed obliquely to the tool axis, for example the shaft of the tool in order to achieve a soft first cut, which has a higher degree of quiet running, longer tool life, and a lower cutting pressure of the tool and to effect higher stability of the tool, in particular with small shaft diameters.

9 Claims, 2 Drawing Sheets

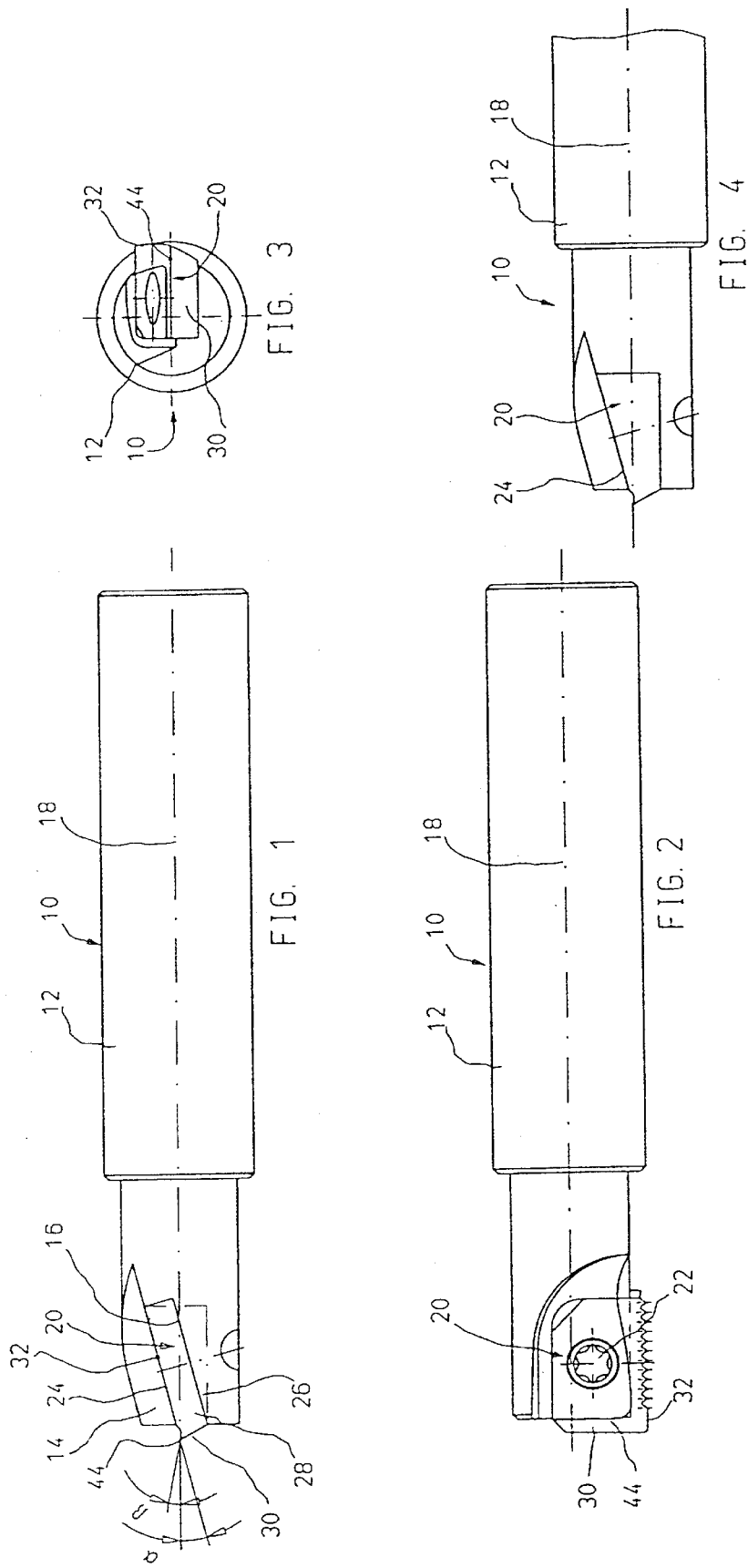

CUTTER PLATE FOR MILLING TOOL

FIELD AND BACKGROUND OF THE INVENTION

The present invention relates in general to milling tools, and in particular, to a new and useful cutting plate for milling tools.

European patent document EP-A-0392730 discloses an indexable insert in a conventional milling tool, with straight cutting edge. The indexable insert is set at an angle to the axis of the shaft of the tool. The result is a tool in which the rake angle and the clearance angle change continuously. Since this is disadvantageous, it is here suggested to implement the true rake and the back in such a way that they are curved in order to achieve the effect wherein the clearance angle and the rake angle are essentially invariably constant over the length of the cutting edge. This reference does not disclose the shapes of the chip guide and back. The application of the suggested cutting edge shape on cutter plates with a true rake could lead to elliptical curves when viewed from the top for the edges limiting the true rake. But the divergence of these curves would subsequently extend toward the front face because the cutter plate is installed with such slope to the shaft axis that the front-face region of the cutting edge precedes the end of the cutting edge facing the driving side. This leads to the disadvantage that the shaft thickness under the bottom of the cutting plate is thinned.

German patent document DE-A-36 18 574 discloses an indexable insert whose top surface is doubly curved, namely it comprises a combined convex-concave curvature. The rake angle is said to be constant and positive along the cutting edge. The axial true rake angle, thus the angle at which the cutting edge is inclined toward the rotation axis of the shaft, is selected such that the front-face end of the cutting edge leads. The double curvature of the true rake leads to the fact that the exit edge falls within the region of the second main cutting edge, which means that these two edges, in top view onto the cutter plate, do not diverge from the front face. In the case of cutter plates for small shaft diameters the stability of the tool is problematic because the shaft in the region of the plate support is strongly thinned.

SUMMARY OF THE INVENTION

It is the task of the present invention to create a new cutter plate which yields soft cutting behavior and a high degree of quiet running, in which a soft first cut generates a low cutting pressure and which makes possible a configuration on the shaft which lends greatly to the stability in this region of the plate support.

The task of the present invention is solved by providing a cutting plate having uniquely arranged surfaces and edges, in accordance with the present invention.

The cutter plate implemented according to the invention permits its oblique disposition relative to the shaft axis such that the material strength of the shaft in the region of the plate support increases toward the driving side of the shaft. A decisive advantage in terms of stability is gained, which makes it possible to apply such cutter plates in the case of very small shaft diameters. Due to the oblique positioning of the cutter plate a soft first cut is attained since the cutting edge segments enter the workpiece sequentially. The new cutter plate yields a soft cutting behavior while exhibiting an extremely high degree of quiet running and, based on the low cutting pressure, higher milling accuracies are also achieved. The new cutter plate has an extremely large lip angle whose position—relative to the cutter plate itself—changes continuously over the length of the edge. While the angle between broadside face and back does change continuously over the length of the edge, this change is compensated through the oblique installation of the plate.

The chip guide groove is broadened in a similar way if the plate alone is considered, however after being mounted on the shaft, a constant broad chip guide groove, relative to the rotation axis, is achieved with the result that the rake angle also remains constant.

In a further development of the invention the side face adjoining the cutting edge forms at least approximately a helicoidal surface or is enveloped by it. The back does not form exactly a helicoidal surface in the geometric sense but rather represents a surface that is curved along the cutting edge as well as also transversely to it, which in the mounted state on the shaft is set relative to a cylindrical surface by the clearance angle.

An especially advantageous further development of the invention provides that the cutting edge comprises a multi-toothed thread cutting profile whose teeth are disposed on the back and whose tooth edges—viewed in a direction toward a narrow face between the top and bottom of the plate—is at least approximately straight and extend parallel to each other at an acute angle to the broad face, whose 90° complementary angle is equal to the angle between the broad face and the axis of an imaginary body of revolution. This can be implemented as a cylinder or as a cone. In this thread cutter plate the longer tool life due to soft first cut and the greater precision of the finished threads through the decreased cutting pressure come to bear especially clearly as advantages. Through the extremely large lip angle more stable cutting edges are attained. Multiple cutter plates can be used in multiple rows.

Also, a still further development of the invention provides that to the narrow face is adjoined at least approximately right angles by a narrow front face whose edge, formed together with the broad face, forms a further cutting edge acting as a front cutting edge which is adjoined, in the broad face, by a further chip guide groove. With this milling tool it is possible, for example, in a first working cycle to drill a circular bore, and subsequently, threads can be cut into the bore.

The invention relates furthermore to a milling tool with the new cutter plate which is detachably attached in a recess of a rotationally symmetric shaft, wherein the recess comprises a bottom surface on which the cutter plate is braced with its second broad face, wherein the first broad face comprising the cutting edge forms with the axis of the shaft an acute angle in the range from 5° to 30°. The bottom surface of the recess has this acute angle and the two broadside faces of the cutter plate extend at least approximately parallel. An alternative to this preferred embodiment provides the bottom surface of the recess, paraxially. The cutter plate in that case must be wedge shaped in order to dispose the broad face comprising the cutting edge or cutting edges, at said acute angle. The front cutting edge is therein intersected by the axis of the shaft.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The invention will be described in further detail in conjunction with the drawings which show an embodiment of the invention, and wherein:

FIG. 1 is a side view of a milling tool with shaft and cutter plate;

FIG. 2 is a top view onto the milling tool;

FIG. 3 is a front view of the milling tool according to FIGS. 1 and 2;

FIG. 4 is a side view of the milling tool similar to FIG. 1, however with a modified embodiment of the cutter plate.

DESCRIPTION OF THE PREFERRED EMBODIMENT

Figure 5:
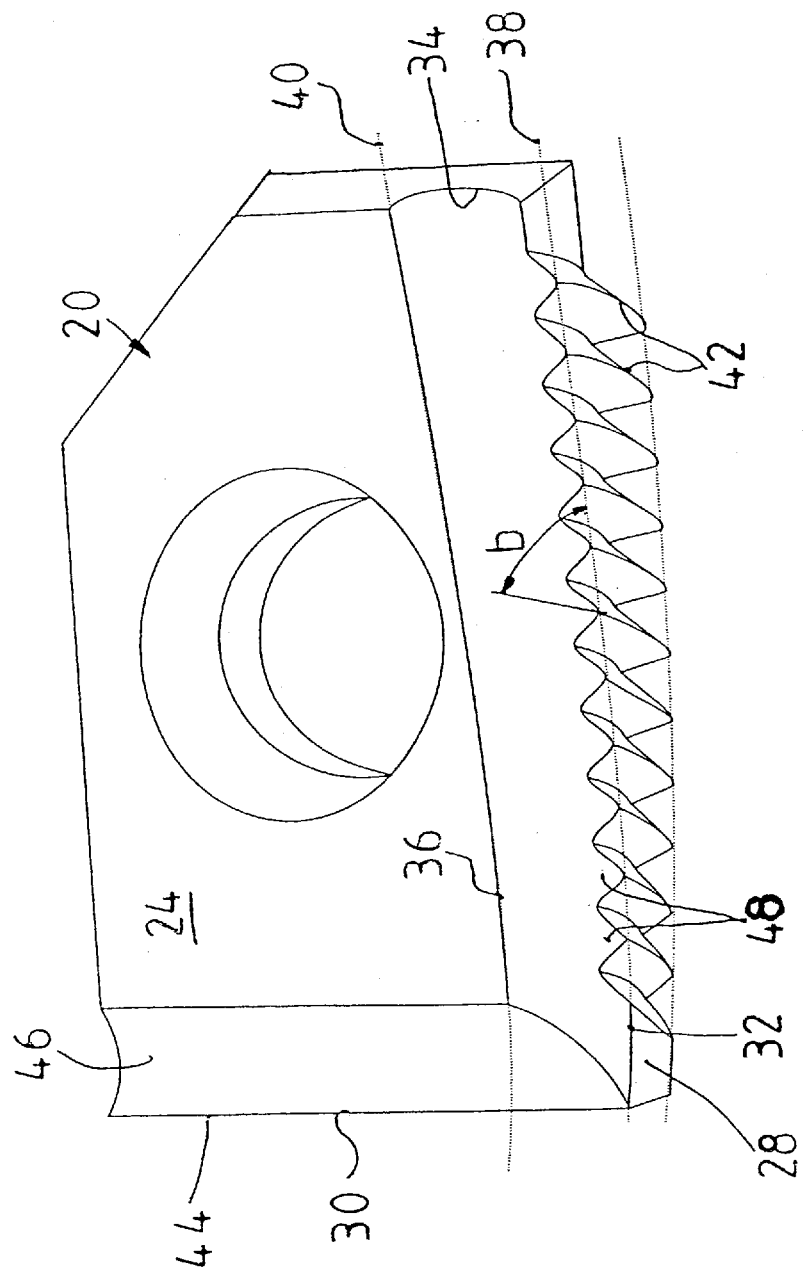
FIG. 5 is a three-dimensional view of the cutter plate.

A milling tool 10 comprises a cylindrical shaft 12 which, at its front end, has a recess 14 with a support face 16 which forms an acute angle with the shaft axis 18. A cutter plate 20 is braced on support face 16. Plate 20 is fastened by means of a screw 22 penetrating a hole of the cutter plate 20. Angle alpha in the embodiment, is 15°.

The cutter plate 20 has the form of a prism, with a top surface 24, a bottom surface 26 (FIG. 1) parallel to it, a narrow-side face 28 extending in the longitudinal direction of the cutter plate 20 and a frontal surface 30. The top surface 24 and the bottom surface 28 intersect at a cutting edge 32 which, in FIG. 5, is shown in dotted lines, and which comprises the tooth peaks of a thread cutting profile. Instead of the tooth profile, the cutting edge 32 can also comprise a continuous edge. Adjacent the cutting edge 32, the cutter plate 20 comprises, in the top surface 24, a chip guide groove 34 which forms a chip outlet edge 36 with the top surface 24. The chip guide groove 34 is concave in cross section and forms with the normal to the cutting face of the tool, the rake angle. The cutting edge 32 and the chip outlet edge 36 in top view are disposed on the cutter plate 20 on elliptical curves 38 and 40. The width of the chip groove 34 increases continuously from the front end of the cutter plate 20 at surface 30, toward its shaft end, so that the two elliptical curves 38, 40 diverge in this direction. In the side view according to FIG. 1, the chip outlet edge 36 traces a straight line while the cutting edge 32 traces nearly, however not exactly, a straight line but rather a slightly convexly curved line, wherein the cutting edge 32 at the front end of the cutter plate 20 is slightly below the plane of the top surface 24. In this way, it is possible to define the cutting edge 32 to trace at least approximately a helicoidal path about the axis 18 of shaft 12.

To fabricate the edge design of the cutter plate 20, it is attached to shaft 12 in the predetermined oblique position of, for example, 15°. The tool 10 is chucked in a working device in which the tool can be shifted longitudinally and is rotatable about the tool axis, wherein a gearing ensures that the tool is moved on a helical path along a grinding wheel. At a cutting edge diameter of 16 mm and a cutter plate angle a alpha 15°, a pitch of 160 mm is set in the device. With this setting the tool is moved several times back and forth on the rotating grinding wheel wherein this is advanced by a specific upstroke on the cutter plate in order to attain the desired depth of the chip groove 34.

Subsequently in the same chucking of the tool the narrow face 28 is ground, for which purpose the tool is helically moved back and forth at the predetermined slope and the grinding wheel is advanced stepwise. The result is a helicoidal-surface narrow-side face 28.

These two grinding processes can be carried out simultaneously with the same grinding wheel if it is appropriately profiled.

Next the thread profile is ground into the narrow face 28. For this purpose the tool is moved in the same chucking position toward a wheel or disc provided appropriately with tooth profiling. This disk is 2° conical with which during the rotation of the tool a corresponding clearance angle is generated on the cutting profile. Conversely, when using a cylindrical wheel a corresponding setting angle of the tooth profile relative to the grinding wheel would have to be set, wherein the two slope angles of the teeth are different. It is understood that during the grinding of the thread profile, no axial movement of the tool takes place. In the side view of the cutter plate 20, thus in the view onto the narrow-side face 28, the edges 42 of the teeth 48 extend in straight lines and parallel to each other at an angle of 75° to the broad face. This angle is denoted in FIG. 5 by b and represents the 90° complementary angle to the setting angle alpha of the cutter plate 20 to the shaft axis 18. The tooth edges 42—apart from their clearance angle—are on a surface wound in the form of a helicoid, which corresponds to the previously ground narrow face 28.

The cutter plate 20 comprises additionally at the front side a front cutting edge 44 which is adjoined in the broadside face 24 by a chip guide groove 46. The cutting edge 44 and the chip outlet edge of the chip guide groove 46 extend in a straight line and parallel. The rake angle beta (β) indicated in FIG. 1, is 11°. The two cutting edges 32, 44 form an angle with one another of somewhat less than 90°.

The cutter plate 20 thus described serves for countersinking a hole wherein during the return travel of the machine spindle threads can be cut into the hole with the same cutter plate.

As can be seen in FIG. 11 the front cutting edge 44 is at the level of axis 18 of shaft 12, thus is intersected by it. The shaft is thinned at the front-side end of the plate support; however this attenuation decreases rapidly due to the oblique position of the cutter plate 20 so that at the shaft-side end of the cutter plate more than half the shaft cross section is available for receiving the cutting pressure.

The cutter plate 20 can be equipped with two opposing thread cutting profiles and front edges in order to use it as an indexable insert.

While the specific embodiment of the invention has been shown and described in detail to illustrate the application of the principles of the invention, it will be understood that the invention may be embodied otherwise without departing from such principles.

What is claimed is:

1. A cutter plate (20) for detachable attachment to a shaft (12) of a milling tool (10) having an axis (18), the plate comprising: two at least approximately planar broad surfaces (24, 26), forming a top surface (24) and a bottom surface (26); a frontal surface (30); a rearward surface facing away from the frontal surface; at least one side surface (28); at least one cutting edge (32) between the top surface (24) and the side surface (28); a chip guide groove (34) adjoining the top surface (24) at a chip outlet edge (36); the cutting edge (32) being disposed on an at least approximately helicoidal path of an imaginary body of revolution, about the axis (18); the top surface forming an acute angle in the range of about 5° to 30° with the axis (18); the cutting edge (32) and the chip outlet edge (36), seen in a top view onto the top surface (24), being disposed at least approximately on elliptical curves (38, 40) which in said top view diverge from each other in a direction away from the frontal surface (30), toward the rearward surface of the plate; an angle formed between the side surface (28) and the top surface (24)

increasing continuously along the cutting edge (32) in the direction toward the chip groove (34), an edge formed between said top surface (24) and said frontal surface (30) including a further cutting edge (44) which adjoins the top surface (24) at a further chin guide groove (46).

2. A cutter plate as claimed in claim 1, wherein the side surface (28) adjoining the cutting edge (32) forms at least approximately a helicoidal surface.

3. A cutter plate as claimed in claim 1, wherein the cutting edge (32) comprises a multi-tooth thread cutting profile with teeth (46) which are enveloped by a back formed by the side surface (28), wherein edges (42) of the tooth (42), viewed in a direction toward the side surface (28), extend at least approximately in a straight line and parallel, at an acute angle to the top surface (24), whose 90° complementary angle is equal to the angle between the top surface (24) and the axis (18) of the imaginary body of revolution.

4. A cutter plate as claimed in claims 1, wherein that the body of revolution is a circular cylinder.

5. A cutter plate as claimed in claims 1, wherein the body of revolution is a cone.

6. A milling tool in connection with the cutter plate as claimed in claim 1, wherein the cutter plate (20) is detachably fastened in a recess (14) of a rotationally symmetrical shaft (12), wherein the recess (14) comprises a support face (16) on which the cutter plate (20) is braced with its bottom surface (26), the top surface (24) forming with the axis (18) of the shaft (12) an acute angle in the range from 5° to 30° and the shaft thickness below the support surface (16) of the recess (14) increasing toward a driving side of the shaft.

7. A milling tool as claimed in claim 6, wherein the support surface (16) of the recess (14) forms the acute angle in the range from 5° to 30° with the axis (18) of the shaft, and the top and bottom surfaces (24, 26) of the cutter plate (20) extend at least approximately parallel.

8. A milling tool as claimed in claim 6, including the further cutting edge (44) is intersected by the axis (18) of the shaft (12).

9. A cutter plate (20) for detachable attachment to a shaft (12) of a milling tool (10) having an axis (18), the plate comprising: two at least approximately planar broad surfaces (24, 26), forming a top surface (24) and a bottom surface (26); a frontal surface (30); a rearward surface facing away from the frontal surface; at least one side surface (28); at least one cutting edge (32) between the top surface (24) and the side surface (28); a chip guide groove (34) adjoining the top surface (24) at a chip outlet edge (36); the cutting edge (32) being disposed on an at least approximately helicoidal path of an imaginary body of revolution, about the axis (18); the top surface forming an acute angle in the range of about 5° to 30° with the axis (18); the cutting edge (32) and the chip outlet edge (36), seen in a top view onto the top surface (24), being disposed at least approximately on elliptical curves (38, 40) which in said top view diverge from each other in a direction away from the frontal surface (30), toward the rearward surface of the plate; an angle formed between the side surface (28) and the top surface (24) increasing continuously along the cutting edge (32) in the direction toward the chip groove (34), the cutter plate (20) being detachably fastened in a recess (14) of a rotationally symmetrical shaft (12), wherein the recess (14) comprises a support face (16) on which the cutter plate (20) is braced with its bottom surface (26), the top surface (24) forming with the axis (18) of the shaft (12) an acute angle in the range from 5° to 30° and the shaft thickness below the support surface (16) of the recess (14) increasing toward a driving side of the shaft, the cutter plate including a second cutting edge (44) which is intersected by the axis (18) of the shaft (12).

* * * * *